May 31, 1966  E. OLAH  3,253,476
VARIABLE SPEED DRILL
Filed Sept. 20, 1963
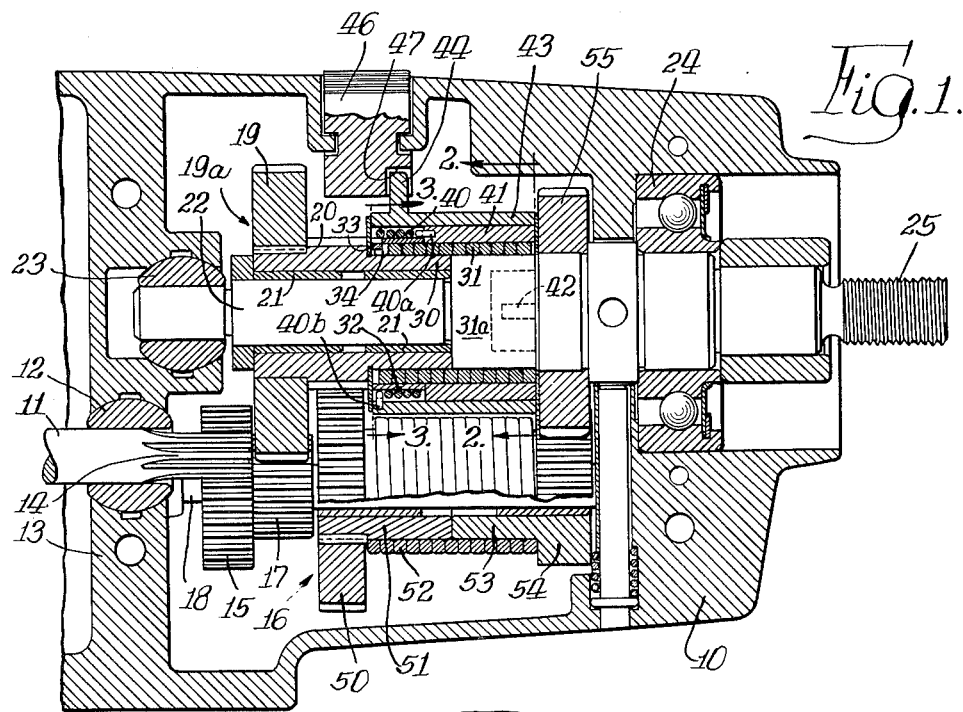
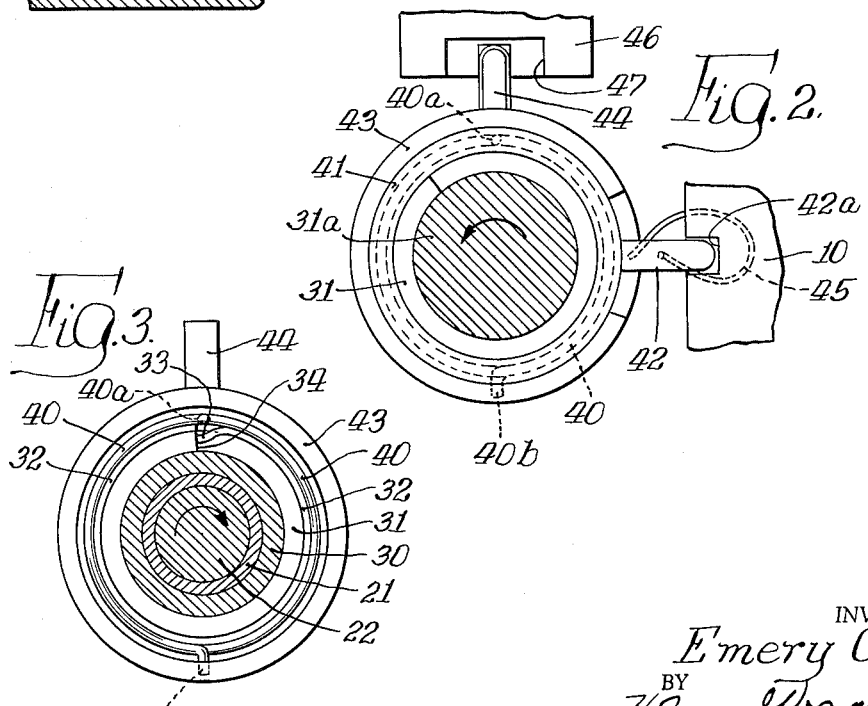
INVENTOR.
*Emery Olah*

United States Patent Office 3,253,476
Patented May 31, 1966

3,253,476
VARIABLE SPEED DRILL
Emery Olah, St. Charles, Ill., assignor to Portable Electric Tools, Inc., a corporation of Illinois
Filed Sept. 20, 1963, Ser. No. 310,357
6 Claims. (Cl. 74—368)

This invention relates to a tool, and more particularly to a variable speed drill and components thereof.

A primary object of this invention is to provide a new and useful tool.

Another object is to provide a new and useful variable speed power transmission for a tool, and more particularly for a drill.

A further object is provision of a new and useful tool having a plurality of clutch drives for operating the tool at different speeds, and a speed control actuating a clutch to operate one of the clutch drives which controls another clutch drive.

A more specific object is the provision of a new and useful variable speed tool having drive means and an output shaft, with a plurality of power transmission means between the drive means and shaft for driving the shaft at different speeds, one of the power transmission means being releasably engageable for driving the shaft and a second of the power transmission means including an output portion and being releasably engageable for driving the output portion, the shaft and output portion being connected for driving the shaft when the second power transmission is operatively engaged and for releasing the second power transmission means responsive to the shaft being driven by the first power transmission means, and a self-energizing clutch operable for releasably engaging the first power transmission means.

Other objects and advantages of the invention will become readily apparent from the following detailed description taken in connection with the accompanying drawings, in which:

FIGURE 1 is a fragmentary view, generally in longitudinal section, of a preferred embodiment of the invention in the form of a variable speed drill, with parts broken away for clearer illustration;

FIGURE 2 is a fragmentary sectional view taken generally along the line 2—2 of FIGURE 1, with parts removed for clearer illustration; and FIGURE 3 is a sectional view taken generally along the line 3—3 of FIGURE 1, with parts removed for clearer illustration.

While I have shown and shall hereinafter describe one embodiment of the invention, it is to be understood that the invention is capable of many modifications. Changes, therefore, in the construction and arrangement may be made without departing from the spirit and scope of the invention as defined in the appended claims.

Referring to the drawings, an electric drill has a housing 10 suitably mounting drive means in the form of a constant speed electric motor having a motor shaft defining a driven input shaft 11. Shaft 11 is rotatably mounted in a self-centering journal 12 in a housing partition 13 for alignment of a spline-type gear 14 on an end of the shaft with a gear 15 of power transmission mechanism 16. Gear 15 is part of an integral cluster including a pinion 17 mounted for free rotation on a stationary intermediate shaft 18 fixedly mounted in housing 10. Pinion 17 drives a gear 19 which is part of a cluster 19a including a pinion 20. This cluster is mounted by means of sleeve bushings 21 for free rotation on a spindle output shaft 22. Shaft 22 is generally parallel to shaft 18 and is mounted for rotation in housing 10 by means of a self-aligning bushing 23 at the rear end of shaft 22 and a ball bearing assembly 24 adjacent the front end of the shaft which is threaded as at 25 for receiving a suitable chuck.

Power transmission mechanism 16 further includes a plurality of power transmission means for driving shaft 22 at different speeds. One of these power transmission means includes a clutch having a cylindrical boss or drum 30, integral with cluster 19a, and telescopically receiving a spiral spring 31 having normally abutting convolutions generally square in cross-section and wound in a direction opposite the normal direction of rotation of shaft 22. In the illustrated embodiment, shaft 22 turns counterclockwise when viewed from the chuck end and a left-hand spring 31 is provided. An opposite end of spring 31 is telescoped on a cylindrical boss 31a integral with shaft 22 so that when spring 31 grips the bosses the shaft is rotated.

Means for operating spring 31 to grip the bosses is provided, and herein a control sleeve 32 is closely telescoped over the rear end of spring 31 and has an inwardly directed tab 33 engaging a transverse end face 34 of the rear of the spring telescoped on boss 30, thus preventing relative rotation between the spring and sleeve 32 particularly upon attempted clockwise rotation of spring 31 as viewed in FIG. 3. Boss 30 is driven in the same direction as shaft 22 and normally has slight frictional engagement with spring 31 to tighten spring 31 about bosses 30 and 31a, thus driving shaft 22 responsive to operation of input shaft 11 and incidentally rotating sleeve 32 in the same direction.

Means is provided for holding sleeve 32 against rotation with respect to housing 10, thus holding spring end 34 and tab 33 to cause the spring to release its grip on bosses 30 and 31a so that the cluster 19a rotates independently of shaft 22. Herein this means is in the form of a clutch having a spiral spring 40 telescoped about sleeve 32 for tightly gripping the sleeve and effectively holding this sleeve against rotation. Spring 40 is wound in a direction opposite the direction of rotation of shaft 22 and sleeve 32, and in the illustrated embodiment, is a left-hand spring having one end 40a anchored in a sleeve 41 effectively fixed with respect to housing 10 as by an integral anchor tab 42 extending outwardly from sleeve 41 and seated in a suitable slot 42a in the housing. An opposite end 40b of spring 40 is anchored in a sleeve 43 telescoped over sleeves 32 and 41 and having an outwardly extending actuating tab 44 for moving sleeve 43 circumferentially a limited amount about shaft 22 and thereby circumferentially expanding or contracting spring 40 to release or grip sleeve 32, respectively. In the illustrated embodiment an overcenter spring 45 (see FIG. 2) is provided interconnecting sleeve 43 and anchor tab 42 to provide a snap-action as sleeve 43 moves between its positions. Movement of sleeve 43 between its positions is provided by a slide 46 suitably mounted in housing 10 for sliding movement transversely of the axis of the sleeve 32. A notch 47 in slide 46 closely and freely receives actuating tab 44 to move sleeve 43 between its positions. Thus, spindle shaft 22 is either drivingly coupled with driving gear cluster 19a through the medium of spring 31 or is released from driving engagement therewith depending upon the position of slide 46. Slide 46 and associated elements is, in all figures, shown intermediate its two positions for purposes of clarity and convenience of illustration. In actuality it never remains in that position but merely passes through the same to either extreme position.

In the illustrated embodiment a second power transmission means is provided for driving shaft 22 at a slower speed than the previously described mechanism, and includes a gear 50 mounted for free rotation on intermediate shaft 18. A clutch or coupling has a cylindrical boss 51 integral with gear 50 and telescopically receiving one end portion of a spiral spring 52, generally similar to spring 31, and wound in a direction opposite the direction of rotation of boss 51. As illustrated, boss 51 rotates clockwise as viewed from the chuck end of the drill and a right-hand spring 52 is provided. An opposite end of spring 52 is telescopically received on a boss 53 formed integrally with a pinion 54 and mounted for free rotation on intermediate shaft 18. Thus, boss 51 provides an input portion for the coupling, and when this boss is driven at a higher speed than boss 53, which defines an output portion, spring 52 grips these bosses to drive gear 54 responsive to rotation of input shaft 11. When boss 53 rotates faster than boss 51, gripping engagement of spring 52 is released so that gear 54 turns independently of gear 50.

Means is provided for driving spindle shaft 22 through the second drive means when slide 46 is positioned for slow speed operation and through the first drive means when slide 46 is positioned for high speed operation. Herein this means is in the form of pinion 54 meshed with gear 55 on shaft 22 and is made possible by the fact that gear 54 is released from spring 52 when rotated faster than gear 50 but gripped when gear 50 attempts to rotate faster.

The gear ratios through power transmission mechanism 16 are such that when boss 30 and boss 31a are drivingly engaged, spindle shaft 22 is driven in a high speed range, and boss 53 of the second power transmission means is driven at a speed higher than boss 51. When slide 46 is positioned for low speed operations it releases driving engagement between spring 31 and bosses 30 and 31a, the speed of pinion 54, and more particularly boss 53 drops, and boss 51 operates at a speed sufficient to drive spring 52 and thereby boss 53, so that spindle shaft 22 is driven through gearing 54 and 55 at a lower rate of speed. Suitable indicia may be provided on housing 10 adjacent slide 46 for appropriately indicating high or low operating speed of spindle shaft 22.

To summarize the operation of the drill, with the drive motor operating and input shaft 11 rotating, the position of slide 46 determines the speed of rotation of spindle shaft 22. More particularly, slide 46 is coupled with spring 40 for releasing this spring from gripping engagement with control sleeve 32 so that sleeve 32 may rotate with clutch spring 31 permitting spring 31 to drivingly engage bosses 30 and 31a to drive the spindle shaft. Under these circumstances, gear 55 of spindle shaft 22 drives pinion 54 and its associated boss 53 on intermediate shaft 18 at a speed higher than the speed of boss 51 so that spring 52 is out of driving engagement with bosses 51 and 53. By moving slide 46 to its other position, spring 40 grippingly engages sleeve 32 to stop rotation of this sleeve whereupon clutch spring 31 is released from driving engagement with spindle shaft boss 31a, and the speed of boss 53 drops while pinion 20 and gear 50 drive boss 51 at a sufficient speed to drivingly engage clutch spring 52 with bosses 51 and 53 thereupon driving spindle shaft 22 through pinion 54 and gear 55.

It should be noted that the construction is such that upon stopping operation of the drive motor, the drives act as brakes for stopping rotation of spindle shaft 22, so that the drill does not continue to whirl for appreciable periods of time.

I claim:

1. A variable speed drill comprising: an input shaft, an output shaft, a plurality of power transmission means between said shafts for driving said output shaft at different speeds with said input shaft operating at constant speed, one of said power transmission means being releasably engageable for driving said output shaft and including axially aligned rotatably mounted input and output bosses normally rotated in one direction, a first spiral spring wound opposite said direction and having opposite end portions, one snugly and slidably telescoped over each of said bosses, a control sleeve telescopically received over said spring and holding an end of said spring at said input boss against rotation with respect to said sleeve, means for controlling engagement of said one power transmission means and including a second spiral spring wound opposite said direction and telescoped over said sleeve, means holding said second spring against rotation with said sleeve, means for alternatively holding said second spring in non-gripping engagement with said sleeve permitting said one transmission means to be drivingly coupled and in gripping engagement with said sleeve to hold said sleeve against rotation thereby releasing said one power transmission means, the other of said power transmission means including means having input and output portions connected with said input and output shafts, respectively, and operably releasably engaged for driving said output shaft responsive to operation of said input portion at a speed not less than that of said output portion and operably released responsive to the speed of said output portion exceeding that of said input portion and means connecting said output shaft and said output portion for driving said output portion at a speed greater than said input portion when said one power transmission means is engaged for driving said output shaft.

2. A variable speed drive comprising: an input shaft, an output shaft, a plurality of power transmission means between said shafts for driving said output shaft at different speeds with said input shaft operating at constant speed, one of said power transmission means being releasably engageable for driving said output shaft, spring clutch means for controlling engagement of said one power transmission means, a second of said power transmission means including releasable means having input and output portions connected with said input and output shafts, respectively, and operably releasably engaged for driving said output shaft responsive to operation of said input portion at a speed not less than that of said output portion and operably released responsive to the speed of said output portion exceeding that of said input portion and means connecting said output shaft and said output portion for driving said output portion at a speed greater than said input portion when said one power transmission means is engaged and for driving said output shaft when said second means is operably engaged.

3. A variable speed drive comprising: drive means, an output shaft, a plurality of power transmission means releasably engageable between said drive means and shaft for driving said shaft at different speeds responsive to operation of said drive means, self-energizing clutch means for releasably engaging one of said power transmission means to drive said shaft, a second of said power transmission means including an output portion operably releasably engageable for driving said output portion and means connecting said drive means and said output portion for driving said shaft when said second transmission means is operably engaged and for releasing said second transmission means responsive to said first means driving said shaft.

4. A variable speed drill comprising: a housing, an input shaft and an output shaft rotatably mounted in said housing, a plurality of power transmission means between said shafts for driving said output shaft at different speeds with said input shaft operating at constant speed, one of said power transmission means being releasably operably engageable for driving said output shaft, clutch means for releasably engaging said one power transmission means and including a control sleeve operatively rotatable in one direction, a spiral spring wound opposite said direction and telescoped over said sleeve, means comprising concentric first and second sleeves anchoring opposite ends of said spring and holding said spring against rotation with said control sleeve and for releasably holding said spring in gripping engagement with said control sleeve to hold said control sleeve against rotation and thereby releasing said first power transmission means, said first sleeve being effectively fixedly anchored to said housing and said second sleeve being mounted for limited rotation between positions about said spring to tighten and loosen said spring with respect to said control sleeve, actuator means for moving said second sleeve between said positions, and overcenter means connected with said second sleeve to drive the last said sleeve between its positions responsive to operation of said actuating means.

5. A variable speed drive comprising: an input shaft, an output shaft, a plurality of power transmission means between said shafts for driving said output shaft at different speeds for a given speed of said input shaft, one of said power transmission means being releasably operably engageable for driving said output shaft, clutch means for controlling said one power transmission means and including a control sleeve operatively rotatable in one direction and operable when held against rotation in said one direction to release said one power transmission, a spiral spring wound opposite said direction and telescoped over said sleeve, means holding said spring against rotation with said sleeve and for releasably holding said spring in gripping engagement with said sleeve to hold said sleeve against rotation thereby releasing said first power transmission means, a second of said power transmission means operably releasably engaged for driving said output shaft and operably released responsive to operable engagement of said one power transmission means.

6. A variable speed drive comprising: an input shaft, an output shaft and a first and second power transmission means between said shafts for driving said output shaft at different speeds for a given speed of said input shaft, said first power transmission means including a clutch comprising a first cylindrical member operatively associated with said input shaft, a second cylindrical member operatively associated with said output shaft and a coupling member in the form of a helically wound spring overlying said cylindrical members in a position such that when slightly constricted drivingly to connect said members, said spring being wound in a direction to multiply its gripping action when said second cylindrical member is being driven by said first cylindrical member, said second power transmission means being operable to drive said output shaft at a lower speed than said first transmission means and including an overrunning clutch, and control means for the clutch of said first power transmission means comprising self-energizing clutch means operable in one position to free said helical spring for drivingly connecting said first and second cylindrical members and operable in another position to restrain said helical spring against rotation and hence against drivingly connecting said first and second cylindrical members.

References Cited by the Examiner
UNITED STATES PATENTS 2,951,568  9/1960  Hungerford et al.
3,090,248  5/1963  Kurtz _____ 74—368
3,110,192  11/1963  Hood _____ 74—368

DAVID J. WILLIAMOWSKY, *Primary Examiner.*

DON A. WAITE, HENRY S. LAYTON,
*Assistant Examiners.*